Patented June 19, 1923.

1,459,536

UNITED STATES PATENT OFFICE.

FILIP KAČER, OF MANNHEIM, GERMANY, ASSIGNOR TO BADISCHE ANILIN- & SODA-FABRIK, OF LUDWIGSHAFEN-ON-RHINE, GERMANY, A CORPORATION OF GERMANY.

MANUFACTURE OF VAT COLORING MATTERS.

No Drawing.   Application filed January 4, 1923. Serial No. 610,706.

*To all whom it may concern:*

Be it known that I, FILIP KAČER, citizen of the German Empire, residing at Mannheim, Germany, have invented new and useful Improvements in the Manufacture of Vat Coloring Matters, of which the following is a specification.

I have found that very valuable vat coloring matters which are thiazol derivatives of 2-amino-anthraquinone, can be obtained by condensing 1-mercapto-2-amino-anthraquinone

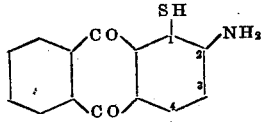

or derivatives of this compound with an aromatic compound containing as substituents in its molecule at least two reactive carbon atoms, by which term I comprise a carboxylic or aldehyde group, or their equivalents, carbonyl chlorid-COCl, di- or trihalogen methyl groups and the like. The proportions should be such as to allow one molecular proportion of the last-named compound to react with two, or more, molecular proportions of the mercapto-amino-anthraquinone. Instead of the latter, 2-amino-anthraquinone and sulfur can sometimes be used.

The dyestuffs obtained according to this invention are characterized by giving violet hydrosulfite vats and dissolved in concentrated sulfuric acid with yellowish colors. By melting with caustic alkali the known fast blue vat dyestuff n-dihydro-anthraquinone-azine is produced and an aromatic polycarbonic acid.

By combining, for instance, one molecular proportion of terephaloyl-chlorid with two molecular proportions of 1-mercapto-2-amino-anthraquinone, a thiazol dyestuff is produced, represented by the following formula:—

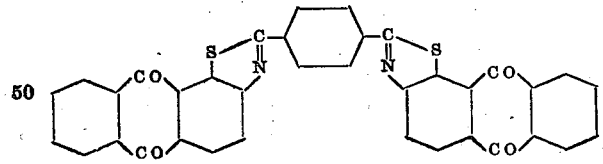

The following examples illustrate some modes of carrying the invention into effect, but the invention is not limited to the examples. The parts are by weight:—

Example 1.

Dissolve 10 parts of 1-mercapto-2-amino-anthraquinone and 4 parts of terephthaloyl-chlorid in 100 parts of nitrobenzene and heat to boiling point. The solution which is first yellowish red, soon becomes yellow and the thiazol derivative separates out in the form of crystals, while hydrochloric acid gas is evolved. When the formation of thiazol no longer increases, the mass is moderately cooled, filtered and the residue washed with nitrobenzene and then with alcohol and dried. It is a yellow powder which is soluble in sulfuric acid with a reddish yellow color or with a yellow color when the product is further purified, for instance, by precipitating from sulfuric acid with a little water. With alkaline hydrosulfite solution a violet vat is produced, dyeing cotton lemon yellow shades. When subjected to a fusion with alkali, n-dihydro-anthraquinone-azine (indanthrene blue) and terephthalic acid are produced. The same dyestuff is produced by heating ω-tetra- or ω-hexa-chlor-para-xylene with 2-amino-anthraquinone and with sulfur.

When isophthaloyl-chloride is employed a yellow dyestuff with a greenish tinge is obtained.

Example 2.

Heat, to boiling, 10 parts of 1-mercapto-2-amino-anthraquinone, 5 parts of diphenyl-4.4¹-dicarboxylic acid chlorid and 100 parts of nitrobenzene. The ingredients are first dissolved, whereupon the dyestuff separates out. It can be worked up as described in example 1, and is a yellow powder, soluble in concentrated sulfuric acid with a reddish yellow color, and in an alkaline hydrosulfite solution with a violet color. Cotton is dyed orange yellow.

Example 3.

Boil together 10 parts of 1-mercapto-2-amino-anthraquinone, 6 parts of benzophenone-4.4¹-dicarboxylic acid chlorid and 100 parts of nitrobenzene until the formation of dyestuff is finished. Work up as described in example 1. The crude dyestuff dissolves in concentrated sulfuric acid greenish yellow, in an alkaline hydrosulfite solution violet and dyes cotton yellow.

A similar product is obtained by employing benzophenone-2.4¹-dicarboxylic acid chlorid in lieu of the 4.4¹-dicarboxylic acid derivative.

*Example 4.*

Heat to from 140 degrees to 160 degrees centigrade, 25 parts of mesitylene and 150 parts of trichlorbenzene and allow 300 parts of bromine to run in in the course of a few hours. Then expel the excess of bromine and introduce 150 parts of 1-mercapto-2-amino-anthraquinone and heat to boiling for 20 to 30 minutes. Work up as described in example 1. The dyestuff thus obtained gives a violet hydrosulfite vat from which cotton is dyed lemon yellow. Trimesinic acid chlorid can also be employed, the same product being obtained.

The dyestuff produced according to the above examples may be purified by heating with an alkaline hypochlorite solution.

I claim:

1. The process of manufacturing vat coloring matters characterized by condensing a 1-mercapto-2-amino-anthraquinone body with an aromatic compound containing at least two reactive carbon atoms as substituents.

2. The process of manufacturing vat coloring matters characterized by condensing about two molecular proportions of 1-mercapto-2-amino-anthraquinone with one molecular proportion of an aromatic dicarboxylic acid chlorid.

3. The process of manufacturing a vat coloring matter which consists in acting on about two molecular proportions of 1-mercapto-2-amino-anthraquinone with one molecular proportion of a para xylene derivative of the formula.

$$R_2R_1C-\bigcirc-CR_1R_2$$

in which $R_1$ means an oxygen atom, or two halogen atoms, and $R_2$ hydrogen or a halogen atom, or a hydroxyl group.

4. As new articles of manufacture vat coloring matters which are thiazols derived from 1-mercapto-2-amino-anthraquinone and contain at least two such thiazol groups in their molecule and the residue of an aromatic acid containing at least two carboxylic groups, which coloring matters when treated in the alkali melt give n-dihydro-anthraquinone-azine (indanthrene blue) and an aromatic polycarbonic acid, and which dyestuffs dissolve in concentrated sulfuric acid with yellowish colors and dye cotton from a violet hydrosulfite vat yellow tints.

5. As a new article of manufacture a vat coloring matter corresponding to the formula

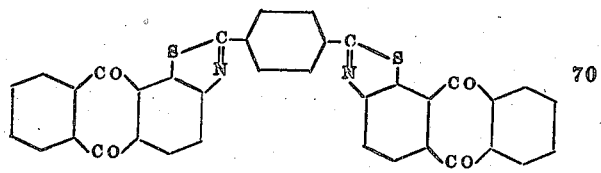

which product when treated in the alkali melt gives n-dihydro-anthraquinone-azine (indanthrene blue) and terephthalic acid, and which product dissolves in a pure state in concentrated sulfuric acid yellow and dyes cotton from a violet vat yellow tints.

In testimony whereof I have hereunto set my hand.

FILIP KAČER.